Nov. 20, 1934.  W. R. SCHLAGE  1,981,289
DOORLOCK FOR HOLLOW METAL DOORS
Filed Feb. 13, 1933  4 Sheets-Sheet 1
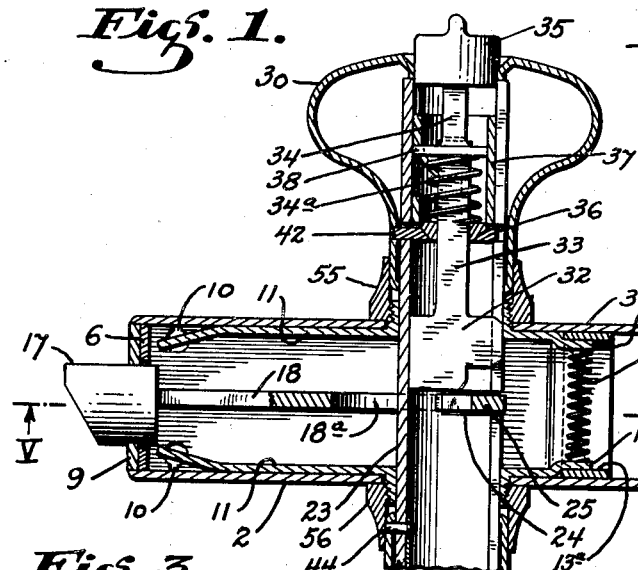
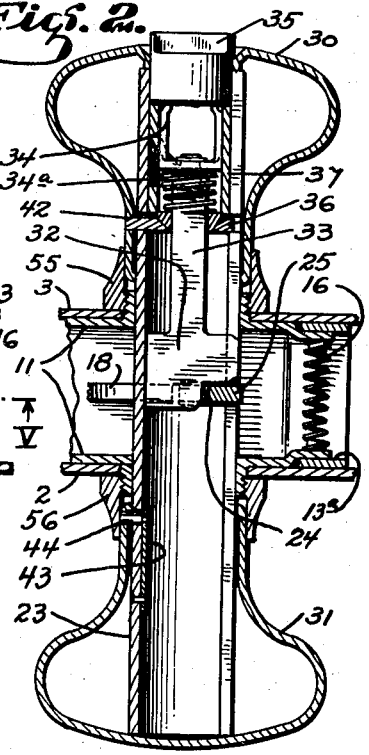
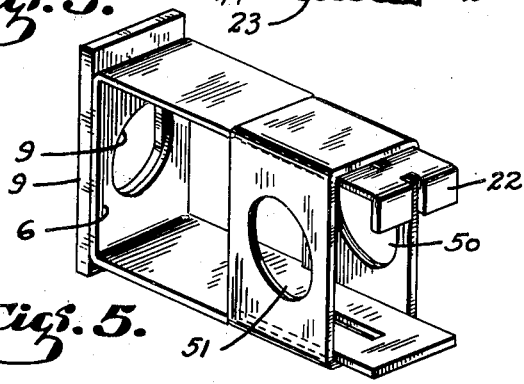
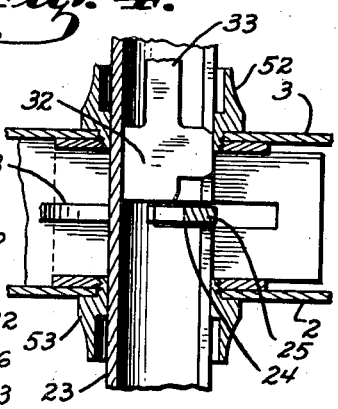
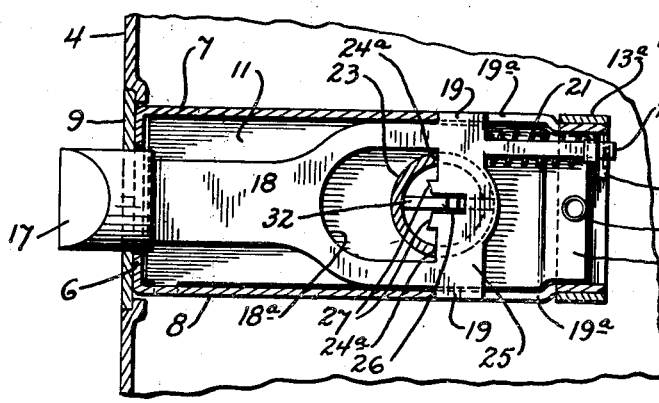
INVENTOR.
Walter R. Schlage
BY Townsend and Loftus
ATTORNEYS.

Nov. 20, 1934.  W. R. SCHLAGE  1,981,289
DOORLOCK FOR HOLLOW METAL DOORS
Filed Feb. 13, 1933     4 Sheets-Sheet 2
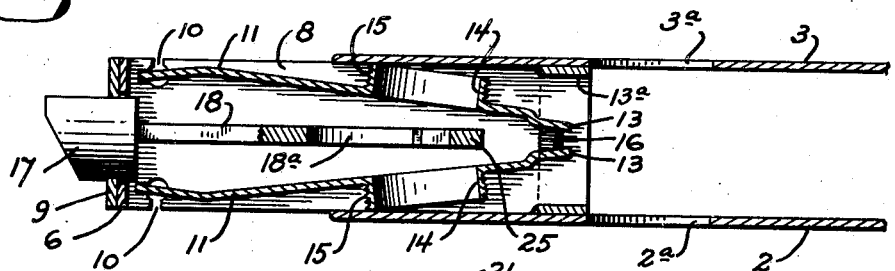
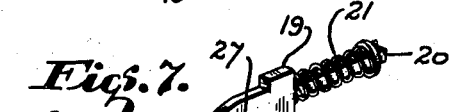
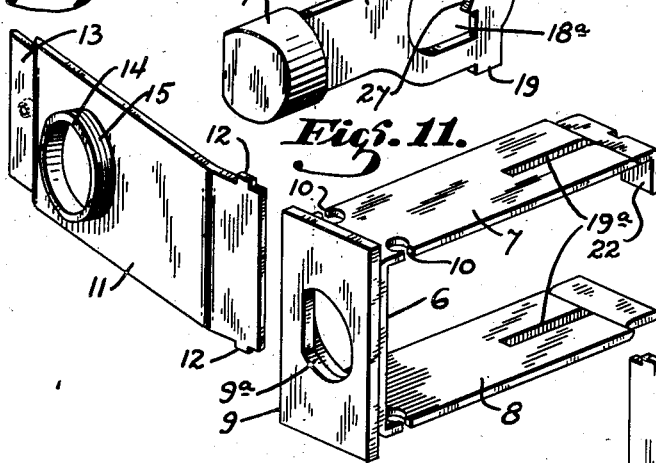
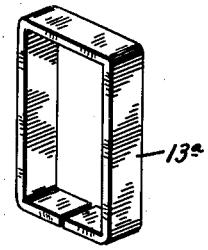
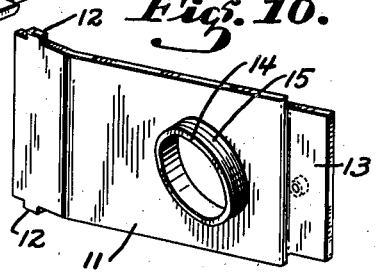
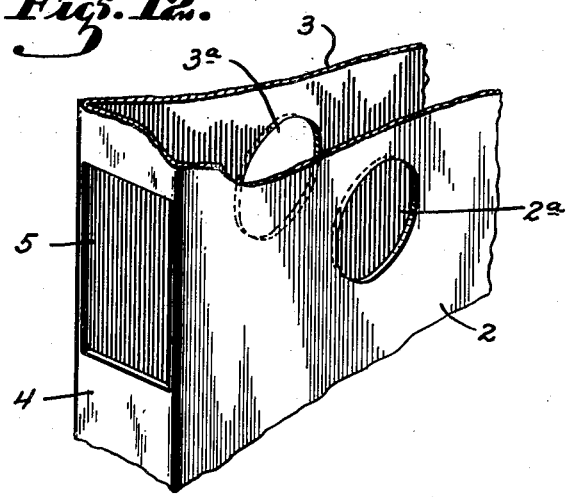
INVENTOR.
Walter R. Schlage.
BY Townsend & Loftus
ATTORNEYS.

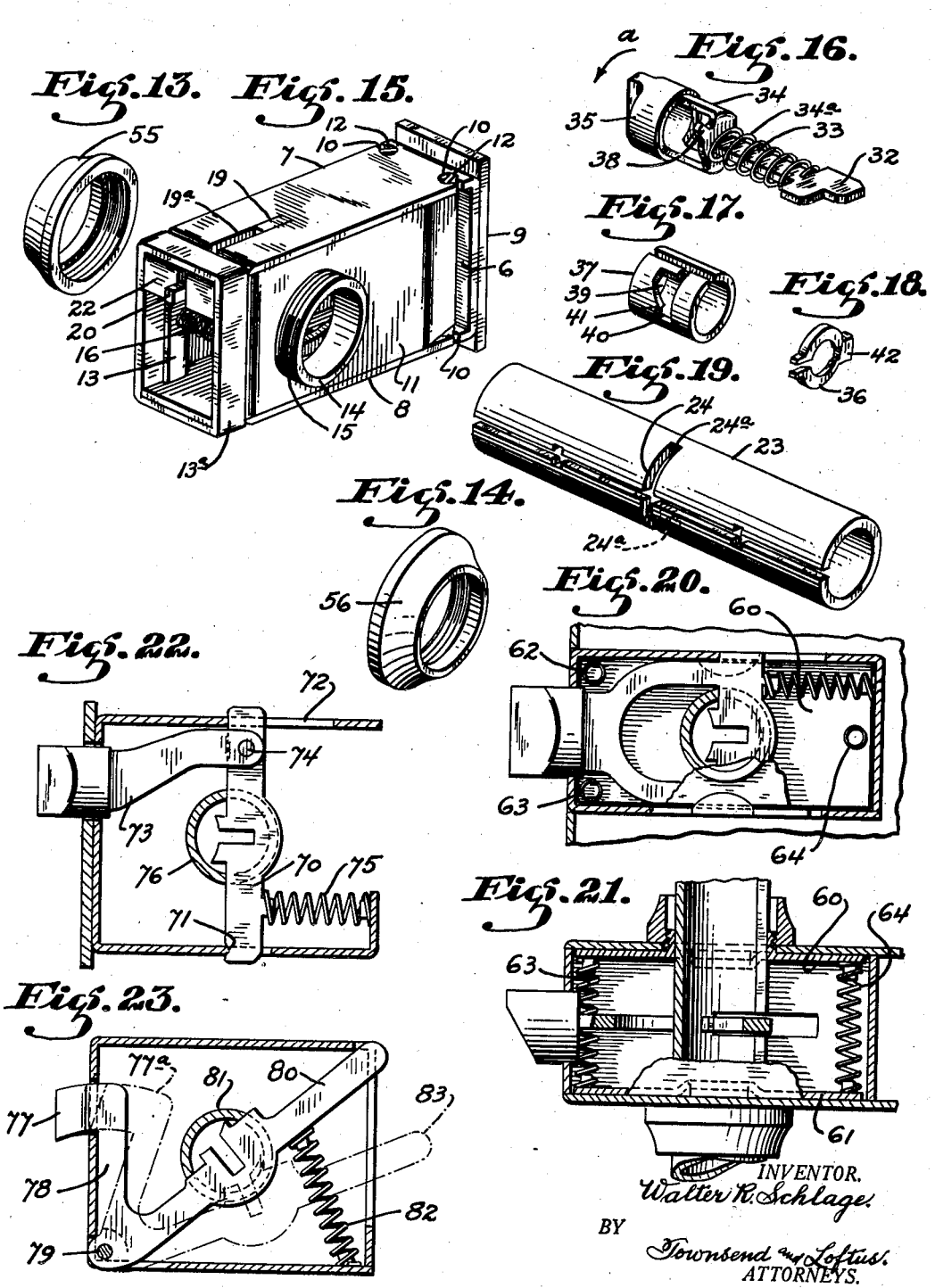

Nov. 20, 1934.  W. R. SCHLAGE  1,981,289
DOORLOCK FOR HOLLOW METAL DOORS
Filed Feb. 13, 1933  4 Sheets-Sheet 4

INVENTOR.
Walter R. Schlage.
BY Townsend and Loftus
ATTORNEYS.

Patented Nov. 20, 1934

1,981,289

UNITED STATES PATENT OFFICE

1,981,289

DOORLOCK FOR HOLLOW METAL DOORS

Walter R. Schlage, San Francisco, Calif., assignor to Schlage Lock Company, San Francisco, Calif., a corporation of California Application February 13, 1933, Serial No. 656,467

20 Claims. (Cl. 70—16)

This invention relates to a lock structure particularly intended for installation in hollow metal doors.

In modern building construction the trend is to eliminate wood and like structural materials as much as possible; for instance, the frame of most modern buildings is constructed throughout of steel. Window sashes and frames constructed of steel have come into general use and a later development is metal doors and frames.

The doors are usually constructed of sheet steel, and while the panels are solid, the stiles are hollow and openings must be punched in the opposite faces and in one edge to permit installation of door locks and other hardware. Considerable trouble has been encountered in rigidly securing the door locks as the sheet steel forming the stile of the door is so thin that threads to receive bolts or screws can hardly be formed, and if bolts or screws are passed completely through the stile the thin metal merely yields or gives as they are drawn up or tightened.

The object of the present invention is to generally improve and simplify the construction and operation of door locks intended for hollow metal doors; to provide a lock housing which will function as a spacer and reinforcing member between the inner faces of the sheet steel forming the stile of the door; to provide a housing of unit type construction which forms a complete support for a latch bolt with connected door knobs, spindles and actuating mechanism, thereby permitting assembling and alignment of all mechanism within the housing proper independently of the door; to provide a housing to which spindle bearings, escutcheon plates, etc., may be secured and which will function as clamping members to secure the sheet steel forming the stile in rigid engagement with the housing placed within the stile; to provide a housing which is adapted to be secured between the inner faces of the sheet steel forming the stile without resorting to welding or similar operations; to provide a housing which is insertable through an opening in the edge of the stile and which carries spindle bearings adapted to be projected through openings formed in the opposite faces of the stile and to extend beyond the outer faces of the stile; to provide a housing which is adapted to be secured against endwise removal from the stile by the spindle bearings; to provide a knob spindle which is adapted to be secured against endwise removal by an interlocking latch bolt retractor bar and further to provide means for dogging the spindle with relation to the housing to prevent rotation of the knobs and opening of the door.

The lock structure is shown by way of illustration in the accompanying drawings, in which—

Fig. 1 is a horizontal section of a door having a hollow stile, said section showing the door lock assembled therein, and said section also showing a dogging member whereby the spindle and knobs may be dogged against rotation.

Fig. 2 is a similar section showing the dogging member in dogging position.

Fig. 3 is a perspectve view showing a modified form of the lock housing.

Fig. 4 is a horizontal section showing the manner in which the spindle bearings are secured with relation to the housing shown in Fig. 3.

Fig. 5 is a vertical section taken on line V—V of Fig. 1.

Fig. 6 is a horizontal section of the hollow stile of the door and of a portion of the lock housing and mechanism carried thereby, said view illustrating the manner in which the lock housing is inserted.

Fig. 7 is a perspective view of the latch bolt and the retractor bar.

Fig. 8 is a perspective view of a keeper sleeve employed in conjunction with the lock housing shown in Figs. 1 and 2.

Figs. 9 and 10 are perspective views of the side plates employed in conjunction with the housing shown in Figs. 1 and 2, said views showing the manner in which the spindle bearings are supported.

Fig. 11 is a perspective view of the lock housing shown in Figs. 1 and 2.

Fig. 12 is a perspective view of a portion of the hollow stile of a metal door.

Figs. 13 and 14 are perspective views of the escutcheon plates employed.

Fig. 15 is a perspective view of the lock housing and the mechanism carried thereby.

Fig. 16 is a perspective view of the dogging member and the thumb button whereby it is actuated.

Fig. 17 is a perspective view of the locking sleeve employed in conjunction with the dogging member.

Fig. 18 is a perspective view of one of the keepers employed in conjunction with the knobs for securing the knob against endwise removal from the spindle.

Fig. 19 is a perspective view of the spindle.

Fig. 20 is a central vertical section showing a modified form of side plate supporting means.

Fig. 21 is a horizontal section taken centrally of Fig. 20.

Fig. 22 is a vertical central section of the lock housing showing a modified form of latch bolt retracting mechanism.

Fig. 23 is a similar section showing another modified form of latch bolt retracting mechanism.

Figs. 24, 25 and 26 show another modified form of latch bolt retracting mechanism, in which Fig. 24 is a central, vertical, longitudinal section taken on line XXIV—XXIV of Fig. 26, Fig. 25 is a vertical cross section taken on line XXV—XXV of Fig. 26, and Fig. 26 is a horizontal plan section taken on line XXVI—XXVI of Fig. 24.

Figure 24:
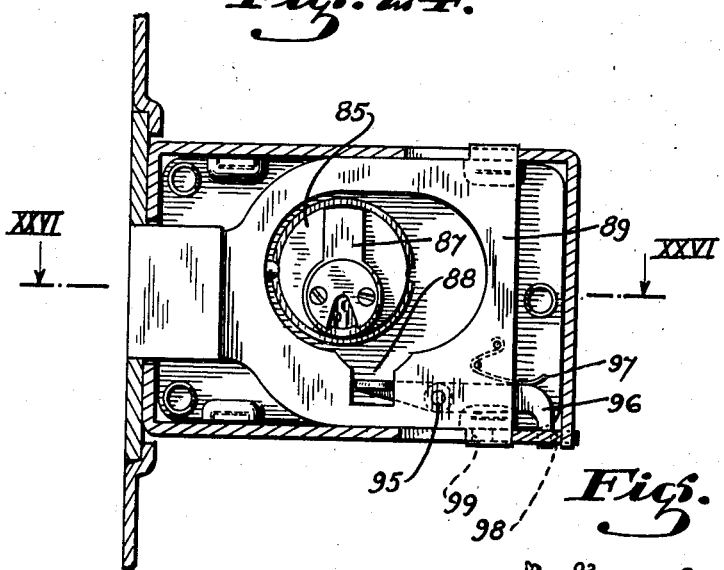

Referring to the drawings in detail, and particularly Fig. 12, it might be stated that metal doors are usually constructed of sheet steel or a similar material. The stile of the door consists of side plates 2 and 3, and an integral end or edge plate 4. The end plate is provided with an opening 5 through which the lock mechanism hereinafter to be described is inserted, and the side plates are provided with openings 2a and 3a through which the spindle bearings extend. The lock housing is perhaps best illustrated in Fig. 11. It consists of a front plate 6 and top and bottom plates, indicated at 7 and 8, respectively. The plates 6, 7 and 8 may be formed as an integral unit and a face plate 9 may be attached thereto. The width of the plates 7 and 8 is equal to the spacing between the inner faces of the plates 2 and 3 forming the hollow stile and the first function of the housing is, accordingly, that of forming a spacer and reinforcing member between these plates. Its second function is that of supporting the lock mechanism and that will be later described.

The plates 7 and 8 forming a part of the housing, shown in Fig. 11, have bearing or pivot openings formed in their forward ends, as shown at 10, and these form supports for side plates generally indicated at 11, see Figs. 9 and 10; the outer ends of the plates being provided with lugs 12, which are insertable in the pivotal openings 10, and the inner ends being provided with lugs 13 which are engaged by a keeper sleeve 13a hereinafter to be described. The side plates serve one main function, to-wit, that of forming supports for spindle bearings. These bearings are indicated at 14 and their exterior surfaces are threaded, as indicated at 15, to receive escutcheon plates hereinafter to be described. The side plates 11 are provided for one purpose and that is to permit them to be swung inwardly, as shown in Fig. 6, when the lock housing is being inserted through the opening 5 in the edge of the door. When the lock housing is fully inserted, the spindle bearings 14 will align with the openings 2a and 3a, and they will then be automatically projected by means of a spring interposed between the inner lugs 13.

The housing, accordingly, forms a support for the side plates 11 and the spindle bearings 14 carried thereby, and these bearings are automatically projected through the openings 2a and 3a when the lock housing is fully inserted, and when they are projected by the spring 16, they function as dogging or locking members to secure the housing against endwise removal through the opening 5 through which it was inserted. The housing also forms a support for a latch bolt 17 and a retractor bar 18 connected therewith. The latch bolt and retractor bar are best illustrated in Fig. 7. The latch bolt proper projects through and is guided by an opening 9a formed in the face or finishing plate 9 of the housing. The front end of the retractor bar 18 is rigidly secured to the bolt while the rear end is supported and guided by means of a pair of lugs 19; these lugs extending into slots 19a formed at the rear or inner ends of the plates 7 and 8 forming a part of the housing. The retractor bar is provided with a pin or extension 20 surrounded by a spring 21. This pin extends through a lug 22 formed at the inner end of the plate 7 in the lock housing, see Fig. 11. The inner end of the spring 21 engages this lug and the other end of the spring engages the lug 19 on the retractor bar, hence if the latch bolt is pushed inwardly the spring will be placed under compression, and when the bolt is released, the spring will extend and project the bolt to a normal extended position; the position of the spring 21 and its action being best illustrated in Fig. 5.

The rear end of the retractor plate 18, see Figs. 5 and 7, is enlarged to reduce the size of the guide lugs 19, and also to permit the formation of a central elongated opening 22 through which a spindle is adapted to project. This spindle is best illustrated in Figs. 1, 5 and 19, and is indicated by the numeral 23. The spindle is tubular and may be constructed in any suitable manner. Its central portion is slotted, as indicated at 24, to permit the spindle to straddle a vertical end bar 25 formed at the inner end of the retractor bar 18. The vertical bar 25 is, in turn, slotted in a horizontal direction, as indicated at 26, and the function of this slot will later appear. Lugs 27 are also formed on the vertical bar 25 and their function is that of limiting rotational movement of the spindle. The spindle is inserted as follows: If the lock housing, which supports the latch bolt 17, the retractor bar 18, the side plates 11, and the spindle bearings 14, has been inserted and properly positioned, the latch bolt is pushed inwardly as far as possible. This brings the central opening 22 formed in the latch retracting bar in a position where it permits the spindle to be freely inserted in an endwise direction through the spindle bearings. When the spindle has been inserted, it is centralized and the latch bolt is released, and when released, it will spring forwardly and the vertical bar 25 will then enter the slot 24 of the spindle, and when the bar 25 enters the slot 24, the spindle is secured against endwise removal as it is dogged or secured by the bar 25.

The spindle serves the following main functions, first that of a support for the inner and outer knobs, indicated at 30 and 31; secondly, it functions as a rollback member which cooperates with the latch bolt retractor bar 18, as shoulders 24a are formed at the end of the slots 24. These shoulders engage the inner face of the bar 25, and when the spindle is rotated in one direction or the other, one or another of the shoulders 24a will engage the inner face of the bar 25 and thus force the retractor bar in an inward direction, thereby causing retraction of the latch bolt, and when the spindle or knob by which it is rotated is released, spring 21, which has been placed under compression, will return the respective parts to normal position. These are the two main functions of the spindle. It, however, has another function, to-wit, that of supporting a dogging member 32 whereby the spindle and knobs may be dogged or locked with relation to the housing so as to prevent rotation of the knobs and spindle and retraction of the bolt. The dogging mechanism is best illustrated in Figs. 1, 2, 16 and 17. It consists of a plate 32 having a shank 33, on the outer end of which is fastened by means of a clip 34, a combination turn and push button 35. A spring 34a surrounds the shank 33 and is interposed between the clip 34 and a keeper, indicated at 36. The dogging member 32 normally assumes the position shown in Fig. 1, but if it is desired to lock the door from the inside, or in other words to dog the knobs and spindles against rotation, the button 35 is first pushed inwardly and then rotated approximately a quarter of a revolution. This position of the locking plate and the button is shown in Fig. 2. The locking plate and button are secured in this position by means of a sleeve 37, see Figs. 1, 2 and 17. On the clip 34 is a projecting finger 38, see Fig. 16. This finger normally lies in a slot 39 formed in the sleeve 37, the sleeve being secured in any suitable manner within the spindle 23. When the button and the dogging plate are pushed inwardly, finger 38 will move inwardly into slot 39 and if the button is then rotated in the direction of arrow a, see Fig. 16, the finger will swing laterally into slot 40 where it is secured by a shoulder 41.

In the depressed position of the dogging plate and button, the spindle is dogged or locked against rotation as the forward end of the dogging plate enters the horizontal slot 26 formed in the vertical bar 25 of the retractor bar 18; that is, with the dogging plate in this position it is impossible to rotate the spindle by means of the knobs as the dogging plate is secured against rotation with relation to the spindle and as it is within the slot 26 it cannot rotate with relation to the retractor bar. Hence, the bolt cannot be retracted and the door is for all purposes locked from the interior. To release the dogging member it is only necessary to turn the button until the finger 38 aligns with the slot 39 and then to release it as the spring surrounding the shank 33 will then cause extension of the button to its normal projected position shown in Fig. 1, and it will at the same time retract the dogging member 32 with relation to the retractor bar 18 and in this position the spindle may be rotated by means of either knob.

The keeper plate 36 is best shown in Figs. 1, 2 and 18. It is ring-shaped as shown, and is provided with a lug 42. This lug projects through a slot in the spindle and also through a slot in the knob and as such functions as a means for securing the knob against endwise removal from the spindle. Both spindles may be secured in the same manner but, in the present instance, a slightly modified form in shown in conjunction with the outer knob 31, see Fig. 1; the means disclosed being a plate 43, see Fig. 2, and a bar 44 carried thereby which is projected through an opening in the spindle and a cooperating opening in the shank of the knob.

The clip member 13a, shown in Fig. 8, is slipped over the inner ends of the plates 7 and 8 forming a part of the lock housing and merely functions as a means for securing the plates 7 and 8 against spreading when the lock mechanism is being operated. It gives the lock housing as a whole greater rigidity and assists in maintaining engagement and alignment of the different parts of the mechanism employed. A somewhat similar keeper plate is shown in Fig. 3, the only difference being that it is wider and that openings 50 and 51 are formed in opposite sides thereof. These openings are threaded and are provided for the reception of spindle bearings 52, such as shown in Fig. 4. The spindle bearings are screwed into the openings 50 and 51, and thus function both as bearings for the spindles and as clamping members to clamp the sheet metal forming the opposite sides of the stile against the lock housing.

In the structure shown in Figs. 9, 10 and 11, it will be noted that the spindle bearings 14 are carried by the side plates 11 and that these are threaded on their exterior surfaces, as indicated at 15. These spindle bearings project through the openings 2a and 3a formed in the stile, see Figs. 1, 2 and 3, and escutcheon plates, such as shown in Figs. 13 and 14, are applied, these escutcheon plates being indicated at 55 and 56. These escutcheons do not only function as clamping members but they also function as escutcheon plates. In the modified structure shown in Figs. 3 and 4, the members 52 and 53 have three functions, as they first of all form spindle bearings; secondly, clamping members; and third, but not least, escutcheon plates.

In Figs. 9, 10 and 11 side plates, provided with spindle bearings 14, are disclosed which are pivotally mounted with relation to the main lock housing. In Figs. 20 and 21 side plates are indicated at 60 and 61. These are laterally slidable between the top and bottom plates 7 and 8 of the housing and they are forced outwardly or against the inner surfaces of the metal forming the stile by means of springs; three springs being employed, as indicated at 62, 63 and 64. These springs extend crosswise of the lock housing and they cause the spindle bearings to be automatically projected outwardly through the openings 2a and 3a of the stile when the lock housing is inserted and in that manner function somewhat similar to the side plates 11 shown in Figs. 1 and 2, the only difference being that they are not pivotally mounted but are free to slide laterally between the top and bottom plates 7 and 8.

In Fig. 22 a modified form of latch bolt retracting mechanism is shown. In this instance a retractor lever 70 is employed. This lever is pivotally mounted in the lock housing at the point 71 and the upper end is guided by a slot 72 through which it projects. A rigid link 73 is attached to the latch bolt and a pivotal connection 74 is formed between the rear end of this link and the retractor lever 70. The bolt is normally maintained in projected position by a spring 75 but it is retracted whenever the spindle, indicated at 76, is rotated.

In Fig. 23 another modification is shown. In this instance the latch bolt, indicated at 77, is secured on the upper end of an arm 78 which is pivotally mounted in the lock housing at the point 79. A lever 80 is formed integral with the arm 78 and this lever is held against the spindle 81 by means of a spring 82. By rotating the spindle, lever 80 is depressed to the dotted line position indicated at 83, and as this lever is formed integral with the arm 78 the bolt is retracted and will assume the dotted line position shown at 77a. The modifications shown in Figs. 22 and 23 are merely disclosed for the purpose of illustrating that the lock mechanism is not limited to the specific form of retractor plate, or latch bolt mechanism, shown in Figs. 1, 5 and 7. Figs. 22 and 23 clearly show that other types of mechanisms may be employed, and in Figs. 24 to 26, inclusive, a structure is illustrated showing the possibility of employing key actuated means on one side of the door and an ordinary turn on the other side. In this instance the same type of lock housing and spindle bearings are employed as shown in Figs. 20 and 21. One spindle bearing is internally threaded, as shown at 14b, to receive a key actuated cylinder lock 85; the lock being secured against removal by a set screw 86. A cylinder plug mounted within the lock, but not shown, carries a rollback member 87 which is adapted to be rotated when a key is inserted and turned, and the rollback member engages a notch 88 formed in the retractor plate 89, thereby extending or retracting the latch bolt depending upon the direction in which the key is rotated.

The turn member or handle 90, on the other side of the lock, is secured on a spindle 91, which is journaled in a bearing 92 and suitably secured to the spindle bearing 14c. A rollback member 93 is secured on the inner end of the spindle, and as this also engages the notch 88 and the retractor plate the latch bolt will be retracted or extended when the spindle 91 is rotated in the proper direction.

Figure 25:
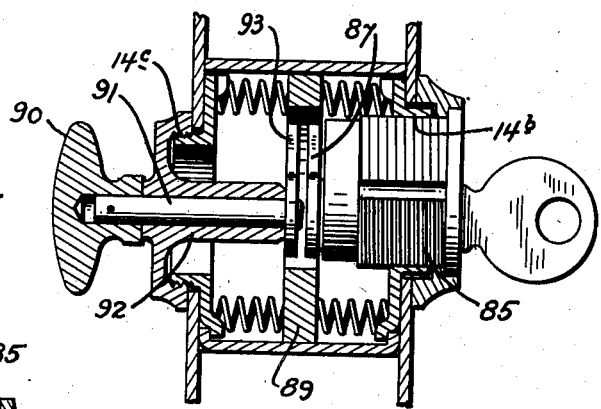
Figure 26:
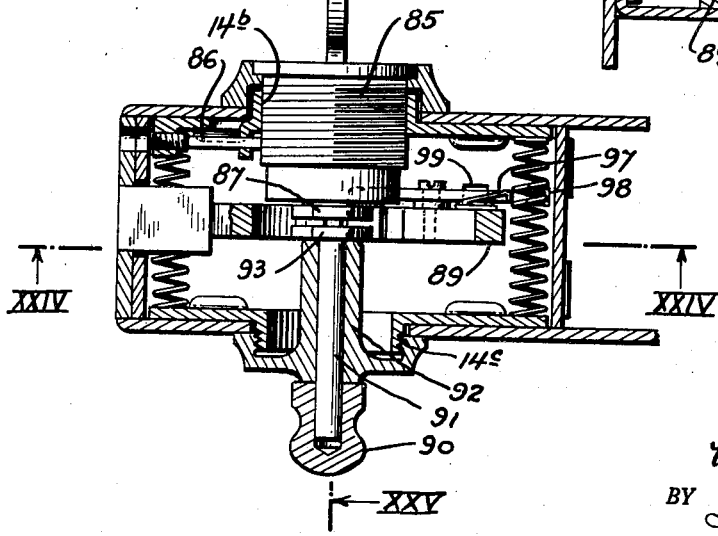

A dead locking member may be employed and is best shown in Figs. 24 and 26. It consists of a lever which is pivotally mounted on the retractor plate at 95. When the latch bolt assumes retracted position a dog 96 on the lever will be projected by means of a spring 97 through an opening 98 in the housing but when the latch bolt is projected by either of the rollback members 87 or 93 the opposite end of the lever will be engaged as it lies in the notch 88. The lever will then be locked about its pivot and the dog will, accordingly, be raised out of the opening, and when the latch bolt is fully projected, the dog will enter a second opening 99, thus dogging or dead locking the latch bolt either in the retracted or projected position.

While certain features of the present invention are more or less specifically described, I wish it understood that various changes may be resorted to within the scope of the appended claims. Similarly, that the materials and finish of the several parts employed may be such as the manufacturer may decide, or varying conditions or uses may demand.

Having thus described my invention, what I claim and desire to secure by Letters Patent is—

1. A lock housing insertable in a hollow metal door stile, said housing forming a spacing and reinforcing member between the inner faces of the metal forming the stile, and projectable means carried by the housing and extending through openings formed in the faces of the stile to secure the housing within the stile and against removal.

2. A lock housing insertable in a hollow metal door stile, said housing forming a spacing and reinforcing member between the inner faces of the metal forming the stile, and projectable means carried by the housing and engageable with the stile to secure the housing against removal.

3. A lock housing insertable in a hollow metal door stile, and housing forming a spacing and reinforcing member between the inner faces of the metal forming the stile, means carried by the housing and projecting through openings formed in the hollow stile, and means carried by the projecting means on the housing and engageable with the exterior faces of the metal forming the stile for clamping the metal of the stile against opposite sides of the housing and to secure the housing against removal.

4. A lock housing insertable in a hollow metal door stile, said housing forming a spacing and reinforcing member between the inner faces of the metal forming the stile, a pair of threaded members carried by the housing and projecting through openings formed in the opposite faces of the hollow stile, and clamping members adapted to be received by said threaded members, said clamping members clamping the metal forming the stile against the housing and securing the housing against removal from the stile.

5. A lock housing insertable in a hollow metal door stile, said stile having openings formed in the inner and outer faces thereof and an opening in the edge, said lock housing being insertable through the opening in the edge of the stile, and means carried by the housing and adapted to project through the openings in the inner and outer faces of the stile, said means securing the housing against endwise removal through the opening through which the housing was inserted.

6. A lock housing insertable in a hollow metal door stile, said stile having openings formed in the inner and outer faces thereof and an opening in the edge, said lock housing being insertable through the opening in the edge of the stile, and a pair of bearing members carried by the housing, said bearing members being resiliently mounted and adapted to be automatically projected through the openings in the inner and outer faces of the stile when aligning therewith.

7. A lock housing insertable in a hollow metal door stile, said stile having openings formed in the inner and outer faces thereof and an opening in the edge, said lock housing being insertable through the opening in the edge of the stile, a pair of spindle bearings carried by the housing, said spindle bearings being resiliently mounted and adapted to be automatically projected through the openings in the inner and outer faces of the stile when aligning therewith, and escutcheon plates secured to said spindle bearings, said escutcheon plates functioning as clamping members to clamp the metal faces of the stile against the housing placed within the stile.

8. In a lock for doors having a hollow metal stile, a housing insertable through an opening formed in the edge of the stile, said housing engaging and supporting the inner faces of the metal forming the stile, detachable spindle bearings one for each side of the housing extending through openings formed in the opposite faces of the stile, and means for securing said bearings both to the housing and the stile.

9. In a lock for doors having a hollow metal stile, a housing insertable through an opening formed in the edge of the stile, said housing engaging and supporting the inner faces of the metal forming the stile, detachable spindle bearings one for each side of the housing extending through openings formed in the opposite faces of the stile, means for securing said bearings with relation to the housing, and means carried by the bearings for clamping the metal faces of the stile against the housing.

10. In a lock for doors having a hollow metal stile, a housing insertable through an opening formed in the edge of the stile, said housing engaging and supporting the inner faces of the metal forming the stile, means carried by the housing and engageable with the edge face of the door to limit inward movement and to support one end of the housing, and other means carried by the housing extending through openings formed in opposite faces of the stile, said means supporting the other end of the housing and securing the housing against endwise removal.

11. In a door having a hollow metal stile with an opening in the edge of the stile and a pair of openings in the opposite faces of the stile, a housing insertable through the opening in the edge of the stile, and interlocking means carried by the housing adapted to extend through the openings in the faces of the stile, said interlocking means supporting one end of the housing and securing the housing against removal through the opening in the edge of the stile.

12. A lock housing insertable in a hollow metal door stile, spindle bearings carried by the housing and projecting through opposite faces of the stile, and a hollow spindle journaled in the bearings, to actuate a latch bolt mechanism carried by the housing.

13. A lock housing insertable in a hollow metal door stile, spindle bearings carried by the housing and projecting through opposite faces of the stile, a hollow spindle journaled in the bearings, to actuate a latch bolt mechanism carried by the housing, and means for rendering the spindle inoperative to prevent retraction of the latch bolt.

14. A lock housing insertable in a hollow metal door stile, spindle bearings carried by the housing and projecting through opposite faces of the stile, a hollow spindle journaled in the bearings to actuate a latch bolt mechanism carried by the housing, a dogging member carried by the hollow spindle to dog the spindle against rotation, and actuating means at one end of the spindle for moving the dogging member into and out of dogging position.

15. A lock housing containing a latch bolt mechanism insertable through an opening formed in a hollow metal door stile, and projectable means carried by the housing and engageable with the stile to secure the housing within the stile.

16. A lock housing containing a latch bolt actuating mechanism insertable through an opening formed in a hollow metal door stile, and projectable means carried by the housing and engageable with the stile to support and secure the housing within the stile.

17. A lock housing containing a latch bolt mechanism insertable through an opening formed in the edge of stile, a flange on the housing engaging the face of the stile and limiting inward movement of the housing, and projectable means carried by the housing and engageable with the stile to secure the housing against removal from said opening.

18. In a door having a hollow metal stile with an opening in the edge of the stile and a pair of openings in opposite faces of the stile, a housing insertable through an opening in the edge of the stile, and resilient projectable means carried by the housing adapted to extend through the openings in the faces of the stile, said projectable means supporting one end of the housing and securing the housing against removal through the opening in the edge of the stile.

19. A lock housing insertable in a hollow metal door stile, a pair of hub members on the housing projecting through openings formed in the opposite faces of the stile, and means supported by the hub members to actuate a latch bolt mechanism.

20. A door lock adapted to be inserted in a hollow metal door, and said door having openings therein through which the lock is inserted, a securing device carried by the door lock, said securing device comprising depressible means adapted to project and form a connection with one or more openings in the stile, said connection retaining the lock against removal from the stile.

WALTER R. SCHLAGE.